United States Patent
Depoilly et al.

(10) Patent No.: US 11,912,611 B2
(45) Date of Patent: Feb. 27, 2024

(54) METHOD FOR TREATING A GLASS-WALLED CONTAINER AND CORRESPONDING APPARATUS

(71) Applicant: SGD S.A., Puteaux (FR)

(72) Inventors: Christophe Depoilly, Aigneville (FR); Pierre-Luc Etchepare, Eu (FR); Jingwei Zhang, Massy (FR)

(73) Assignee: SGD S.A., Puteaux (FR)

( * ) Notice: Subject to any disclaimer, the term of this patent is extended or adjusted under 35 U.S.C. 154(b) by 806 days.

(21) Appl. No.: 16/971,146

(22) PCT Filed: Feb. 22, 2019

(86) PCT No.: PCT/FR2019/050410
§ 371 (c)(1),
(2) Date: Aug. 19, 2020

(87) PCT Pub. No.: WO2019/166719
PCT Pub. Date: Sep. 6, 2019

(65) Prior Publication Data
US 2021/0114921 A1    Apr. 22, 2021

(30) Foreign Application Priority Data

Feb. 27, 2018    (FR) ...................................... 1851747

(51) Int. Cl.
C03C 17/34    (2006.01)
C03C 17/00    (2006.01)
C03C 21/00    (2006.01)

(52) U.S. Cl.
CPC ............ *C03C 17/34* (2013.01); *C03C 17/004* (2013.01); *C03C 17/005* (2013.01);
(Continued)

(58) Field of Classification Search
CPC ...................... C03C 2218/112; C03C 2218/31
See application file for complete search history.

(56) References Cited

U.S. PATENT DOCUMENTS 3,348,934 A  * 10/1967  Hinson ................... C03C 15/00
                                                                 65/32.4
3,451,796 A     6/1969  Mochel
(Continued)

FOREIGN PATENT DOCUMENTS

| FR | 1461182 A | 12/1966 |
| JP | 658604248 A | 4/1983 |
| WO | 2017060636 A1 | 4/2017 |

OTHER PUBLICATIONS

International Search Report issued on International Application PCT/FR2019/050410, dated Jun. 4, 2019, 6 pages, together with English translation.

*Primary Examiner* — Robert A Vetere
(74) *Attorney, Agent, or Firm* — Leber IP Law; Celia H. Leber (57) ABSTRACT

The invention relates to a method, and to an associated apparatus, for treating a container (1) comprising a glass wall (2) defining a receiving cavity (3) for receiving a product, said glass wall (2) having an inner face (4) and an opposite outer face (5), said glass wall (2) being provided with a first coating that includes a solid residual compound resulting from a step of dealkalization of the glass in the vicinity of the surface of said inner face (4) of said glass wall (2) to which said container (1) had previously been subjected, said method comprising a step of spraying the surface of said glass wall (2) with droplets of a liquid, in order to form on said glass wall (2), starting from said first coating, a second coating which includes said residual compound and which is more transparent and/or more uniform than said first coating.—Treatment of glass-walled containers.

15 Claims, 5 Drawing Sheets

(52) U.S. Cl.
CPC ........ *C03C 21/006* (2013.01); *C03C 2217/28* (2013.01); *C03C 2218/112* (2013.01); *C03C 2218/17* (2013.01); *C03C 2218/31* (2013.01)

(56) References Cited

U.S. PATENT DOCUMENTS

| | | | | |
|---|---|---|---|---|
| 4,493,722 | A | * | 1/1985 | Ono ..................... C03B 9/1932 65/72 |
| 5,314,534 | A | | 5/1994 | Giersberg et al. |
| 5,510,144 | A | * | 4/1996 | Cordie ................... C03C 23/00 65/30.13 |
| 2009/0000336 | A1 | | 1/2009 | Rosler |
| 2011/0244153 | A1 | | 10/2011 | Shiozawa et al. |
| 2015/0108078 | A1 | | 4/2015 | Hoekman et al. |

\* cited by examiner

METHOD FOR TREATING A GLASS-WALLED CONTAINER AND CORRESPONDING APPARATUS

CROSS-REFERENCE TO RELATED APPLICATIONS

This application is a National Stage Entry of International Patent Application No. PCT/FR2019/050410, filed Feb. 22, 2019, which claims priority from French Patent Application No. 1851747, filed Feb. 27, 2018, the entire disclosures of which are incorporated herein by reference.

TECHNICAL FIELD

The invention relates to the general field of methods and facilities for processing glass-wall containers.

The invention more particularly relates to a method for processing a container having a glass wall delimiting a cavity for accommodating a product, said glass wall having an inner face located facing said accommodation cavity and an opposite outer face, said glass wall being provided with a first coating that includes a solid residual compound resulting from a step of surface treatment of said glass wall, to which said container has been previously subjected.

The invention also relates to a facility for processing a container having a glass wall delimiting a cavity for accommodating a product, said glass wall having an inner face located facing said accommodation cavity and an opposite outer face, said facility comprising a station for surface treating said glass wall, for subjecting said container to a step of surface treatment of said glass wall leading to the formation on said glass wall of a first coating that includes a solid residual compound.

PRIOR ART

In the field of pharmaceutical glass primary packaging, it is searched to propose containers, in particular of the vial type, that have an excellent chemical compatibility with the product or preparation they are intended to contain. It is indeed aimed to prevent any detrimental interaction between a species coming from the glass forming the container and the product contained in this latter.

In this context, the pharmacopoeias identify three great different types of glass containers, which may be acceptable for a pharmaceutical use according to the nature of the considered preparation. These containers are classified according to their level of hydrolytic resistance, i.e. according to the resistance shown by the glass, of which they are formed, to the transfer of water-soluble inorganic substances in determined conditions of contact between the surface of the considered glass contain and the water. A distinction is made between the borosilicate glass containers, said of "Type I", which have intrinsically an excellent hydrolytic resistance and which thus suit for most pharmaceutical preparations, and the conventional soda-lime-silica glass containers, said of "Type III", whose hydrolytic resistance is far less advantageous. That way, the use of these latter is limited to non-aqueous vehicle preparations for parenteral use, to the powders for parenteral use (except freeze-dried preparations) and to the preparations for non-parenteral use. A distinction is also made between so-called "Type II" glass containers, which are conventional soda-lime-silica glass containers, like the Type III ones, but whose inner face has been subjected to a specific surface treatment in order to significantly improve their hydrolytic resistance. The Type II glass containers thus show an excellent hydrolytic resistance, which makes them suitable for the packaging of most acid and neutral aqueous preparations.

A method is known in particular for surface treating a Type III glass container to obtain a Type II glass container, which consists in substance in extracting, over a depth of several dozens of nanometres, the sodium present in the vicinity of the surface of the inner face of the soda-lime-silica glass container. It is then talked about a glass dealkalization treatment, which is usually performed in line by the container manufacturer, i.e. using means directly integrated to the glassware production line.

As known, this surface treatment method can provide the injection into a container to be treated, whereas the latter is still at a high temperature after its exit from the forming machine, of a sulphur compound such as, in particular, ammonium sulphate $(NH_4)_2SO_4$ in crystalline powder form. Under the effect of heat, the ammonium sulphate crystals sublimate and form a gas that reacts with the sodium contained in the glass in the immediate vicinity of the inner surface of the treated container. The sodium so-extracted from the glass then settles onto the surface of the inner face of the container in the form of a more or less pronounced bloom of a residual powder compound of sodium sulphate $Na_2SO_4$. Having a milky or whitish aspect, this bloom is generally not formed homogeneously at the surface of the container, so that certain zones of the latter appear locally more opaque than other ones. Small stains, more particularly marked, may also be observed on the container walls.

Although this residual bloom is generally not particularly problematic for the latter packaging of preparations, because the concerned glass containers are usually carefully washed before the packaging, it may however be particularly troublesome for certain operations of quality control at the exit of the glassware production line. Firstly, the lack of transparency of this bloom may make difficult the optical inspection of the glass defects, to the detriment of the container quality. Secondly, the heterogeneous, non-uniform aspect of the residual deposit and the presence of stains at the surface of the Type II glass container may be the cause of an unjustified disposal (false rejection). Indeed, as a function of the contrast and sensitivity adjustment of the optical inspection system used, a pronounced stain at the surface of a container is, for example, liable to be interpreted as a glass defect and to cause the unjustified disposal of the concerned container, and hence a loss of income for the container manufacturer.

Of course, it would be conceivable to clear the Type II glass containers of their residual bloom, for example by washing, previously to their inspection. In practice, this solution is generally not adopted by the glass container manufacturers because it would involve the implementation of expensive and complex complementary means, which are generally not compatible with a conventional industrial glass container production line. Moreover, the presence of such a white bloom at the surface of a glass container often constitutes, in the field of pharmaceutical glass primary packaging and in the eyes of the pharmaceutical preparation packaging actors, a singular signature of the Type II glass containers, which visually differentiate them in particular from the Type III glass containers, of lower hydrolytic resistance.

DISCLOSURE OF THE INVENTION

The objects assigned to the present invention consequently aim to remedy the different drawbacks listed hereinabove and to propose a new processing method, as well as a corresponding facility, which allow facilitating the optical inspection of the glass wall of a container on the surface of which has been deposited a solid residual compound.

Another object of the invention aims to propose a new method that is easy and inexpensive to implement, and that requires for its implementation only simple and standard industrial means, while being particularly efficient.

Another object of the invention aims to propose a new method that is particularly reliable, robust and repeatable, while being of safe implementation.

Another object of the invention aims to propose a new processing method that can be implemented in line and that allows high processing rates.

Another object of the invention aims to propose a new facility that allows an efficient, safe and rapid processing of a glass-wall container.

Another object of the invention aims to propose a new facility whose design and implementation are particularly simple and cost-effective.

Another object of the invention aims to propose a new facility that is particularly robust and reliable.

The objects assigned to the invention are achieved by means of a method for processing a container having a glass wall delimiting a cavity for accommodating a product, said glass wall having an inner face located facing said accommodation cavity and an opposite outer face, said glass wall being provided with a first coating that includes a solid residual compound resulting from a step of surface treatment of said glass wall, to which said container has been previously subjected, said surface treatment step being a step of dealkalizing the glass in the vicinity of the surface of said inner face of said glass wall, said method comprising a step of spraying droplets of a liquid onto the surface of said glass wall, in order to form on said glass wall, from said first coating, a second coating that includes said residual compound and that is more transparent and/or more uniform than said first coating.

The objects assigned to the invention are also achieved by means of a facility for processing a container having a glass wall delimiting a cavity for accommodating a product, said glass wall having an inner face located facing said accommodation cavity and an opposite outer face, said facility comprising a station for surface treating said glass wall, for subjecting said container to a step of surface treatment of said glass wall leading to the formation on said glass wall of a first coating that includes a solid residual compound, said surface treatment station being a station for dealkalizing the glass in the vicinity of the surface of the inner face of said glass wall, said facility comprising a station for spraying droplets of a liquid to the surface of said glass wall, said spraying station being positioned downstream from said surface treatment station.

BRIEF DESCRIPTION OF THE DRAWINGS

Other objects and advantages of the invention will appear in more detail upon reading of the following description, with reference to the appended drawings, given by way of purely illustrative and non-limitative examples, in which.

BEST WAY TO IMPLEMENT THE INVENTION

According to a first aspect, the invention relates to a method for processing a container 1 comprising a glass wall 2 delimiting a cavity 3 for accommodating a product (or a substance), said glass wall 2 having an inner face 4, located facing said accommodation cavity 3 and preferentially intended to come into direct contact with said product, and an opposite outer face 5. The concerned container 1 is hence preferentially a hollow glass container. Preferably, said product is advantageously fluid, i.e. liable to flow like, for example, a liquid, pasty (such as a liquid with a high degree of viscosity) or powder substance. Preferably, the container 1 forms a container designed to contain a product or a substance of pharmaceutical nature, such as for example a medication, potentially intended to be administered by parenteral route (general or locoregional) or to be ingested or absorbed by a patient, or also a diagnostic substance, as for example a chemical or biological reagent. By extension, said container 1 can be designed to contain a biological substance (or body fluid), such as for example blood, a blood product or by-product, urine, etc. Even if the application to the pharmaceutical and diagnostic fields is preferred, the invention is however not limited to pharmaceutical and diagnostic-use containers and also relates, as an alternative variant, to a container designed to contain a liquid, pasty or powder substance for industrial (storage of chemical products, etc.), veterinary, food or also cosmetic use.

The concerned container 1 may have any shape adapted to its function, as for example the shape of a vial or a bottle. In this case, the glass wall 2 is advantageously formed by a glass bottom 6, a glass lateral wall 7 that rises from and at the periphery of the bottom 6 and a neck 8 provided with a ring 9 that closes the container 1 while forming a filling/distribution opening 10 putting the cavity 3 in communication with the outside. Said opening 10 is advantageously designed so as to be able to be closed by a plug or a removable or pierceable membrane seal). It is however perfectly conceivable that the container 1 takes any other shape, and in particular a neck-free shape, as for example a jar, a tube, a phial, a syringe or other, as a function of the intended use. Such a glass-wall container 1, and in particular of vial shape, may be obtained by any conventional glassware method (moulded glass, blown glass, drawn glass, Vello method or Danner method, etc.).

Herein, the term "glass" is preferentially understood in its conventional meaning, and hence denotes a mineral glass. Preferentially, the glass constituting the wall 2 of the container 1 is transparent (or at least translucent) as such, so as to allow the visual inspection of said container 1, using conventional optical means, in search for potential glass defects present, in particular, in the thickness of said wall 2 or at its inner face 4. Also, the transparent (or at least translucent) character of the glass may prove to be essential, in the case of a pharmaceutical product, to allow the visual inspection of said product, once the latter packed in said container. Still preferably, the glass constituting the wall of the container is colourless (white glass), but can nevertheless otherwise be coloured, for example by metal oxides, to protect the fluid substance contained in the container from effects of light, in particular in certain wavelength ranges (UV, etc.).

More specifically, the glass wall 2 of the container 1 to which the method of the invention relates is provided with a first coating that includes a solid residual compound resulting from a step of surface treatment of said glass wall 2 to which said container 1 has been previously (and preferably voluntarily) subjected. Advantageously, said residual compound is a solid substance, whose formation and deposition to the surface of the glass wall 2 of the container 1 as said first coating are the consequence of a surface treatment step that said container 1, and in particular the glass wall 2 of the latter, has undergone previously to the implementation of the method according to the invention. Preferably, said residual compound is powdery, granular.

Herein, the term "residual compound" preferably refers to a not specifically desired product or by-product of said surface treatment step. In other words, although the formation, at the surface of the glass wall 2, of the first coating including said solid residual compound is a potentially known and foreseeable consequence of said surface treatment step, it preferentially not constitutes a specifically and voluntarily searched phenomenon thereof, and said residual compound is preferentially not intended to be conserved at the surface of the glass wall 2 of the container 1, in normal use of the latter. Preferably, said residual compound is a substance liable to provide the first coating with an optically observable character, preferably in the visible domain. Preferentially, said first coating takes the form of a whitish or coloured bloom, which is preferably not uniform, not homogeneous and/or has a certain opacity in the visible domain. Said first coating is not necessarily continuous and does not necessarily cover the whole surface of said glass wall 2.

The term "surface treatment" preferentially refers, in the context of the present invention, to an operation aiming to modify the physical and/or chemical properties of the glass at the surface or in the immediate vicinity of the surface of the glass wall 2 of the container 1.

More preferably, said glass wall 2 of the container 1 is made of a glass containing at least one alkaline or alkaline earth oxide (such as, preferentially, a soda-lime-silica glass), and the surface treatment step, to which the container to which the method according to the invention relates has been previously subjected, is a step of dealkalizing the glass in the vicinity of the surface of the inner face 4 of the glass wall 2 of the container 1. Potentially, as will be seen hereinafter, said dealkalization step can also have affected, to some extent, the glass in the vicinity of the surface of the outer face 5 of the glass wall 2 of said container 1. In other words, said surface treatment step can consist in performing a depletion of alkali ions (for example, sodium ions) in the glass forming the wall 2 of the container 1, at the surface of the inner face 4 of said glass wall 2 (as well as, potentially, at the surface of the outer face 5 of the latter), and, preferably, over a depth of several dozens of nanometres. Thus, the container 1 to which the method according to the invention relates can advantageously be a Type II glass container, which has been obtained from a Type III glass container (conventional soda-lime-silica glass) that has undergone a dealkalization step. However, it may potentially be a Type I glass container (borosilicate glass) or also an aluminosilicate glass container, having undergone a dealkalization step, since they are effectively glasses containing at least one alkaline or alkaline earth oxide.

Figure 1:
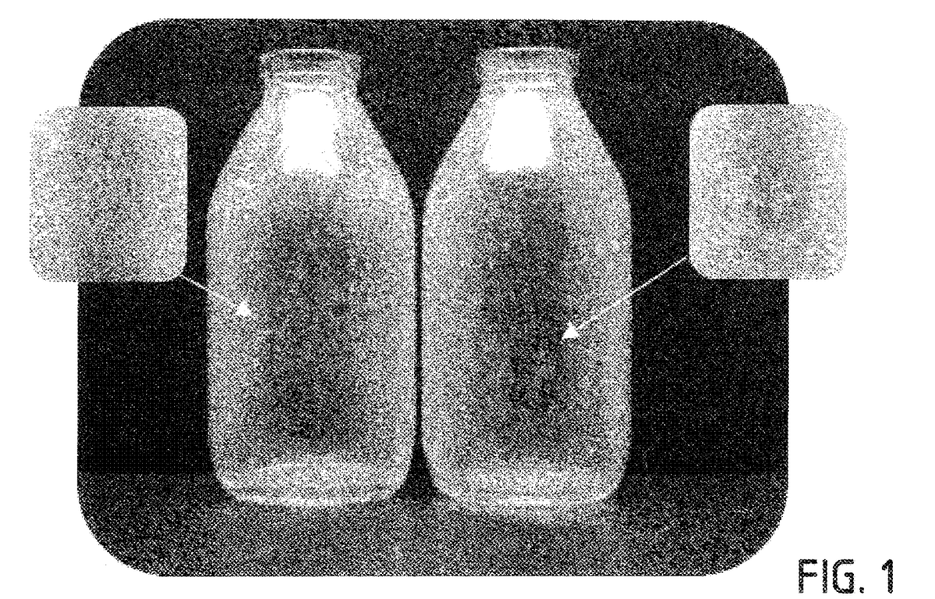
FIG. 1 illustrates containers of the vial type, whose glass wall is provided with a first coating that includes a solid residual compound resulting from a step of surface treatment of said glass wall (herein, a step of dealkalizing the glass in the vicinity of the surface of the inner face of the glass wall), to which said container has been previously subjected. A zone of the glass wall of these containers is magnified, so as to highlight the non-uniform and not-fully transparent character of the first coating in question.

Preferably, said dealkalization step comprises a treatment of said inner face 4 with a substance containing sulphur, which substance is preferentially introduced within the accommodation cavity 3 of the container 1 whereas the latter is at a high temperature (typically of the order of 500 to 650° C.), for example immediately at the exit of a step of forming the container 1 or whereas said container 1 is subjected to an annealing step, after such a step of forming the container 1. Still more preferentially, said substance is ammonium sulphate $(NH_4)_2SO_4$ in crystalline powder form. Said solid residual compound thus contains sodium sulphate $Na_2SO_4$, in powder form, which can be deposited in a particularly non uniform manner to the surface of the inner face 4 of said glass wall 2 of the container 1 (and potentially also to the surface of the outer face 5 of the latter), as illustrated in FIG. 1. As an alternative, said substance could be sulphur dioxide $SO_2$ or sulphur trioxide $SO_3$, or also a substance containing sulphur or fluorine, whose implementation could also lead, in certain conditions, to the formation, at the surface of the glass wall 2, of a coating whose uniformity is perfectible.

According to the invention, the method for processing the glass-wall container 1 comprises a step of spraying droplets of a liquid to, towards, the surface of said glass wall 2 (or at least a part thereof), in order to form on said glass wall 2, from said first coating, a second coating that is advantageously more transparent and/or more uniform than said first coating, as will be explained hereinafter.

According to the invention, the so-formed second coating includes said residual compound. Indeed, the liquid spraying step of the method according to the invention is different from a step of washing the glass wall 2, in that the residual compound is still present at the surface of said glass wall 2 at the end of said spraying step. Thus, whereas the first coating of the glass wall 2 includes, before the spraying step of the method according to the invention, a first mass quantity of residual compound, the second coating formed at the end of said spraying step advantageously includes a second mass quantity of said residual compound, qui is substantially equal to (or potentially very slightly lower than) said first mass quantity. The presence, at the end of the method according to the invention, of the residual compound in the second coating formed at the surface of the glass wall 2 will advantageously be visually observable (presence of a bloom or a visible trouble), and will be able, in any case, to be verified by an observation by means of more advanced optical analysis means, for example by microscopy.

Thus, the invention is based on the idea of spraying droplets, i.e. thin drops, of liquid to said first coating previously formed at the surface of the glass wall 2 of the container 1, so as to advantageously form a layer (or mat) of distinct droplets, spaced apart on the surface of said glass wall 2 on which has been formed said first coating that includes the solid residual compound. In particular, the latter having been preferentially formed at least at the surface of the inner face 4 of the glass wall 2 of the container 1, said spraying step consists in spraying said droplets at least to the surface of said inner face 4, and still more specifically, to the lateral wall 7 of said container 1.

Said liquid droplets, thus locally put into direct contact with the first coating including the residual compound, and then interacting with the latter so as to modify at least one characteristic thereof, which have an influence on the optical properties of the coated glass wall 2.

Indeed, it has been observed that, very interestingly, the spraying of such droplets can advantageously allow modifying, at the surface of the glass wall 2, the configuration of the residual compound. In particular, in the preferential case where the residual compound is powdery, granular, the spraying of droplets advantageously allows locally dissociating the clusters of grains and redistributing the grains in a more spread out and more uniform manner opposite the surface of the glass wall 2.

Figure 2:
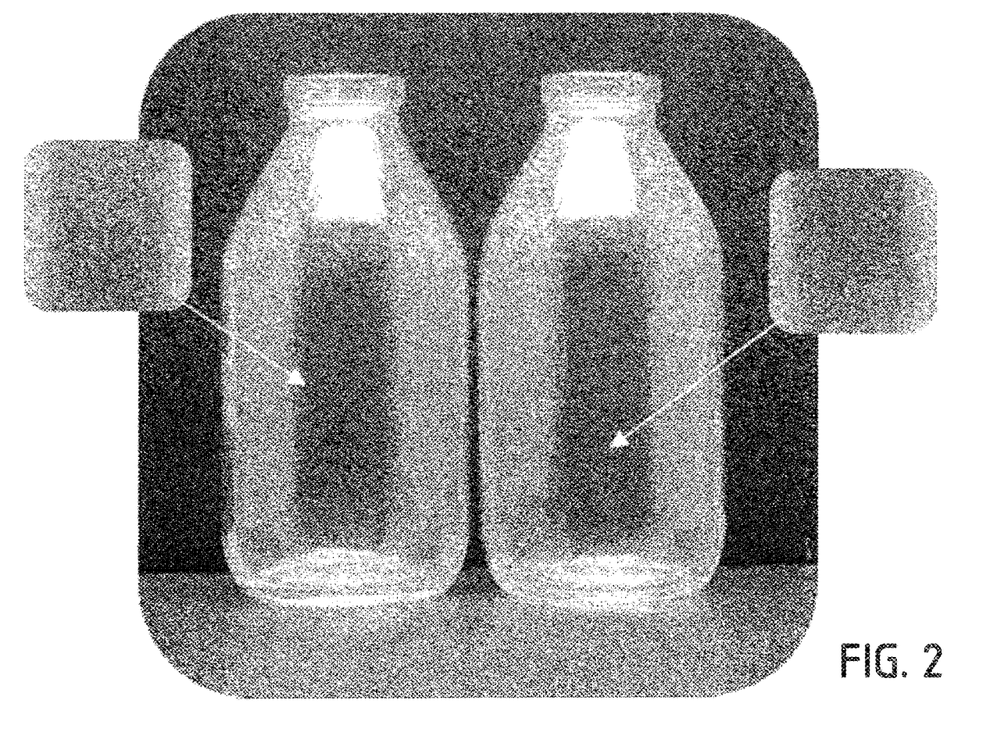
FIG. 2 illustrates containers obtained by subjecting the containers of FIG. 1 to the processing method according to the invention. A zone of the glass wall of these containers is magnified, so as to highlight the more uniform and more transparent character of the second coating formed at the surface of the glass wall.

The method according to the invention can hence allow obtaining, at the surface of the glass wall of the container 1, a second coating that is more uniform, more homogeneous than the first coating initially present at the surface of the glass wall 2 of the container 1. This advantageously leads to an attenuation of the local variations of quantity of residual compound at the surface of said wall 2, liable to form zones that appear more opaque than other ones. Moreover, the effects of stains initially observable at the surface of the glass wall 2 are significantly attenuated, or even totally eliminated. This uniformization effect is particularly visible in FIG. 2, which illustrates as an example containers obtained at the end of the method according to the invention, from containers having a wall made of soda-lime-silica glass subjected to an ammonia sulphate dealkalization treatment, as those illustrated in FIG. 1.

In practice, the uniform, homogeneous, character of the second coating formed at the end of said spraying step can be characterized as follows. The container 1 with a glass wall 2, processed in accordance with the invention, is placed vertically in front of a background of homogeneous colour (for example, black), and the container 1 is illuminated by means of a lamp positioned under and opposite the bottom 6 of the container 1. Then, using a digital reflex camera or a similar device, a front picture of the container 1 and of the background of homogeneous colour is taken. Then, thanks to an image processing software (for example, by means of the "ImageJ" software, developed by the National Institutes of Health of the United-States of America), the taken picture is converted into an 8-bit grey-level digital image. Still by means of the image processing software, a rectangular surface is selected, preferably corresponding to a more or less extended zone of the lateral wall 7 of the container 1, and the grey level curve over the whole selected rectangular surface is drawn. Finally, based on the data corresponding to this grey level curve, the grey level variance of the rectangular surface is calculated (for example, by means of a spreadsheet software). The so-calculated variance is representative of the degree of uniformity of the shade of the selected surface zone of the lateral wall 7, and hence of the degree of uniformity of the coating formed according to the invention. The lower the variance value, the more uniform the coating. It is also possible to verify the gain provided by the method according to the invention in matter of uniformity, by comparing the respective variances obtained, according to the method exposed hereinabove, from pictures taken of a same container before and after the latter has been subjected to said method. Of course, any other suitable method can be implemented to verify and quantify the uniformization effect obtained.

Advantageously, the spraying step of the method according to the invention allows, as introduced hereinabove, the formation of a second coating that, although still including said residual compound, is more transparent than the first coating initially present at the surface of the glass wall 2 of the container 1. Indeed, it has been observed that the spraying of droplets can allow, to some extent, and according to the nature and quantity of the residual compound deposited, increasing the transparency of the coated glass wall 2 of the container 1. Whereas said glass wall 2 provided with the first coating has, before said spraying step, a first transparency level (i.e. it allows the transmission through it of a certain quantity of light to which it is exposed), said wall 2 has indeed advantageously, after said spraying step, a second transparency level, which is higher than said first transparency level. A method for characterizing, verifying, the gain of transparency advantageously provided by the method according to the invention will be exposed hereinafter.

In some case, as will be seen in the tests described hereinafter, the spraying step of the method according to the invention allows, in a particularly interesting and unexpected manner, forming on said glass wall 2, from said first coating, a second coating that includes said residual compound and that is not only more transparent, but also more uniform than the first coating initially present at the surface of said glass wall 2.

The method according to the invention hence allows highly facilitating the later optical inspection of the concerned container 1, in search for glass defects at the glass wall of the container, without previously clearing the glass wall 2 of the container 1 of the residual compound deposit. Herein, the formation of a second, more uniform, coating, although still containing said residual compound, advantageously contributes to a better identification of the high-contrast glass defects and to reduce the risk of false rejection. Obtaining a second, more transparent coating advantageously allows facilitating the detection of most of the lower-contrast glass defects (such as, for example, stains). Preferably, said liquid is sprayed to the surface of said glass wall 2, during said spraying step, in the form of a fog, i.e. in the form of very thin droplets having a mean diameter typically lower, or even far lower, than 1 mm, in suspension in the ambient air (liquid aerosol). Particularly advantageously, a spraying by nebulization and/or atomization, for example, so that at least 95% of said sprayed droplets have a diameter comprised between 1 and 10 μm, and preferably between 2 and 3 μm, will be preferred. Indeed, the use of very small diameter droplets makes it possible, not only to advantageously limit the phenomenon of coalescence of these latter to the surface of the glass wall 2, and the run-off effects that could ensue therefrom, but also to facilitate the putting into contact of said droplets with a glass wall 2 of complex geometry. In order to optimize said liquid spraying step, it is moreover and/or alternatively possible to spray said droplets by means of a vector gas, preferably an inert gas (Ar, $N_2$, etc.). The liquid flowrate (and hence the quantity and the volume of the sprayed droplets) and/or the pressure of the vector gas are of course advantageously regulated, adapted, as a function of the surface area of the glass wall 2 of the container 1 to be processed, and so as to limit the risk of coalescence of the droplets onto the surface of the glass wall 2.

Advantageously, the liquid sprayed during the spraying step of the method according to the invention is a transparent and, still more advantageously, colourless liquid. According to a variant, said liquid is a liquid in which the solid residual compound is liable to be dispersed, to be placed in suspension. According to another variant, more advantageous, said liquid is a solvent of the solid residual compound, i.e. a liquid in which said solid residual compound is liable to be, at least partially, dissolved. Indeed, the implementation of a solvent proves to be beneficial for obtaining a second particularly uniform coating, whether this coating is humid, i.e. formed of the residual compound dissolved in the solvent droplets, or on the contrary dry, i.e. formed of the single residual compound redeposited at the surface of the glass wall 2 after drying/evaporation of the solvent. Also, the use of a solvent can advantageously help in obtaining a second coating that is significantly more transparent than the first coating.

Preferably, said solvent (or said liquid, in this case in which the latter is not a solvent) is water, still preferably ultra-pure water. The use of a liquid, solvent or not, liable to contaminate the container 1 and/or requiring restricting implementation and recycling means, in particular for sanitary or environmental reasons, is also advantageously avoided. Hence, in the case where said residual compound comprises sodium sulphate, ultra-pure water will be preferred to glycerol or also to diluted sulphuric acid, yet also known as solvents of the sodium sulphate. The method according to the invention is hence particularly simple, inexpensive and safe to implement.

Preferably, said spraying step is performed on said container 1, the latter being at a temperature comprised between 0 and 100° C., and still preferably at ambient temperature. Said liquid is advantageously sprayed onto the surface of said glass wall 2 at ambient temperature, or possibly at a higher temperature (for example, 70° C.). If the temperature rising is indeed liable to favour the dissolution or the putting in suspension of the residual compound in the sprayed liquid droplets, a too great temperature difference between the glass wall 2 and the sprayed liquid will be however avoided in order to limit, in particular, the risk of fast coalescence of the droplets onto the surface of said wall 2. Moreover, the implementation of too high temperatures might cause a too fast evaporation of the liquid, with an insufficient dissolution or putting in suspension of the residual compound, prejudicial to the good operation of the method according to the invention, i.e. the optimum operation thereof.

Advantageously, said spraying step is made simultaneously onto the surface of said inner 4 and outer 5 faces of said glass wall 2 of the container 1. Indeed, although preferentially aiming at the treatment of the surface of the inner face 4 of the glass wall 2 of the container 1 (inner processing), said surface treatment step can nevertheless have affected, voluntarily or not, the surface of the outer face 5 of said wall 2. Hence, said first coating could also be formed at the surface of said outer face 5. In particular, in the preferential case mentioned hereinabove, in which said surface treatment step is a step of dealkalizing the glass in the vicinity of the surface of the inner face 4 of the glass wall 2 of the container 1, it is possible that reactive species escape from the accommodating cavity 3 of the container 1 during the dealkalization step and also react with the glass in the vicinity of the surface of the outer face 5 of the glass wall 2. In this case, the simultaneous spraying of the liquid droplets at the surface of said inner 4 and outer 5 faces hence advantageously allows modifying, at the surface of these latter, simultaneously one or several characteristics of the residual compound to form on each of these surfaces a more uniform and/or more transparent coating including said residual compound.

Figures 3, 4:
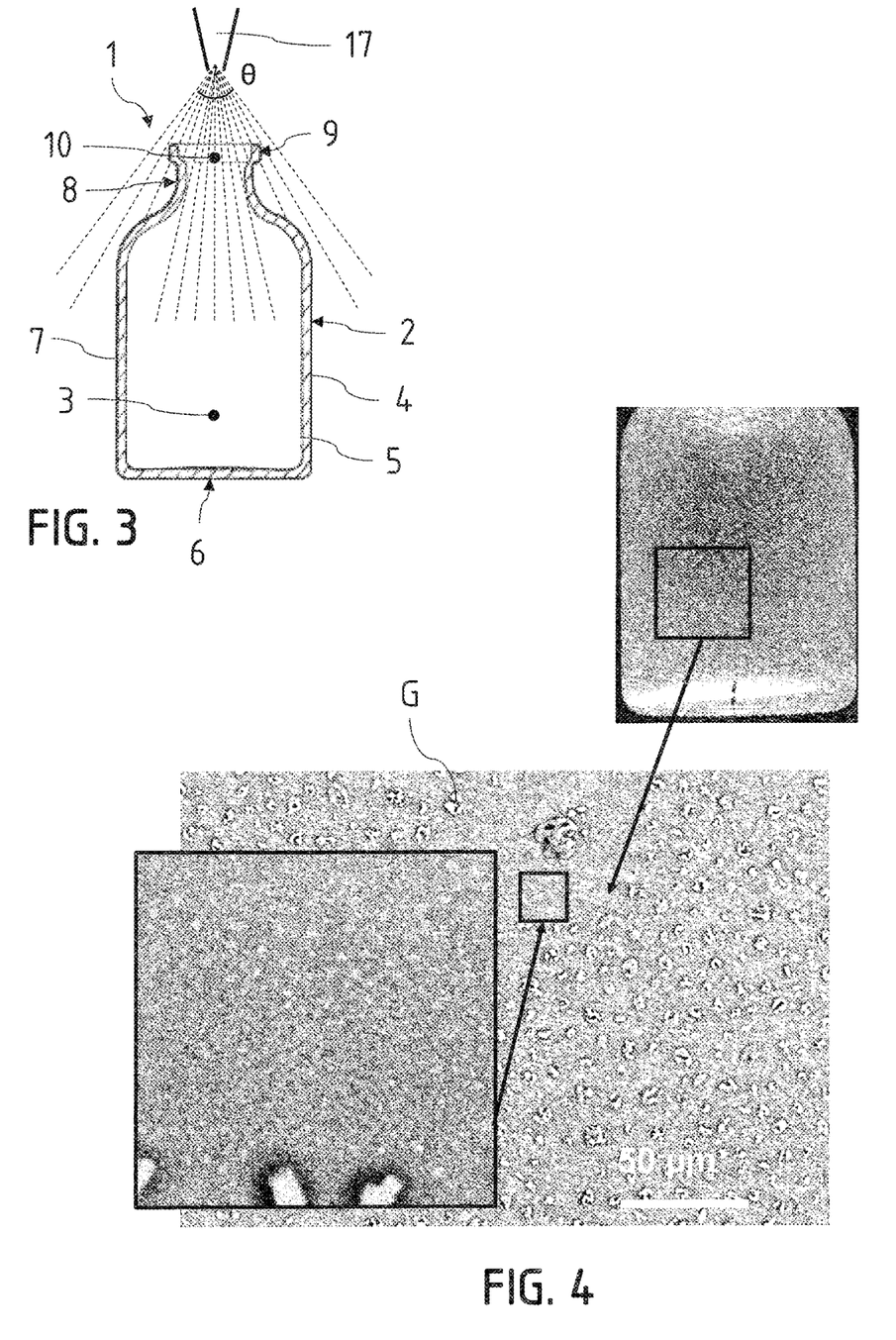
FIG. 3 schematically illustrates a container of a vial type subjected to a preferential embodiment of the step of spraying droplets of liquid of the processing method according to the invention.
FIGS. 4 and 5 highlight pictures, taken by scanning electronic microscopy (SEM), of the surface of the glass wall of two glass-wall containers in accordance with those to which the invention relates, wherein the first container has not been subjected to the method according to the invention (FIG. 4), contrary to the second container (FIG. 5).

Moreover, such a simultaneous spraying of the liquid droplets at the surface of said inner 4 and outer 5 faces advantageously allows simplifying said spraying step. The latter can indeed then be easily implemented by means of a stationary spaying device (for example, of the nozzle type) and positioned outside said container 1, preferentially above and opposite the ring 9 and the opening 10 of the latter, as schematically illustrated in FIG. 3. It is hence not necessary to use a complex mobile injection device (for example of the pipette or tube type) that would be introduced into the accommodation cavity 3 of the container 1 to be processed, through the opening 10 of the latter, to spray the liquid droplets, which could further require the at least temporary immobilization of said container 1.

Advantageously, as illustrated in FIG. 3, said liquid droplets are preferentially sprayed, during said spraying step, substantially according to a spraying cone that is advantageously solid and of angle θ preferentially comprised between 20 and 100°, according to the geometry and dimensions of the container to be processed and according to the distance separating the spraying device from the ring 9 and from the opening 10 of the container 1.

Preferably, the method according to the invention comprises, after said spraying step, a step of forced drying said glass wall 2, i.e. a step of accelerated and controlled drying the latter. Said drying step can advantageously be made by spraying, towards the surface of the glass wall 2, of a forced flow of dry gas (air or inert gas, such as Ar, $N_2$, etc.), so as to dry said glass wall 2 by controlled evaporation of the liquid droplets. As an alternative, it could be conceived that the container 1 is placed vertically, ring 9 towards the top, in an upward forced flow of dry gas. Advantageously, this forced drying step is performed after a time of contact between said liquid droplets and the first coating of the order of a few seconds (typically between 1 and 5 s, as a function, in particular, of the geometry and dimensions of the container to be processed, or also according to the nature of the residual compound and/or of the sprayed liquid). At the end of this drying step, said second coating is hence obtained, by redeposition of said residual compound onto the surface of the glass wall 2, said second coating being more uniform and/or transparent than the first initial coating.

Advantageously, the method according to the invention comprises, after said spraying step, a step of optical inspection (preferably visual) of said glass wall 2, aiming in particular to search for the potential presence of glass defects. Advantageously, said optical inspection step can be performed by means of any known device and according to any known visual inspection method. Preferably, said optical inspection step could be performed by means of a known artificial vision inspection device, advantageously automated, designed for example to detect and identify contrast defects. Of course, the optical inspection step could on the contrary be performed manually by an operator, for example to the naked eye.

Preferentially, said optical inspection step is performed after said forced drying step. That way, any visual disturbance, any undesirable optical effect, that could potentially be generated by the presence of liquid droplets at the surface of the glass wall 2 of the inspected container 1, and their potential coalescence and run-off during inspection, are limited as much as possible.

A study by scanning electronic microscopy (SEM) has been performed by the applicant in order to observe the influence, at the microscopic scale, of the method according to the invention on the aspect of the surface of the glass wall 2. During this study, wall fragments of a first and a second Type II glass vials, both obtained from conventional soda-lime-silica (Type III) glass vials, subjected to an ammonium sulphate surface dealkalization treatment, have been compared. Unlike the first vial (control vial), the second vial has been subjected to the method according to the invention, the liquid sprayed as droplets being ultra-pure water.

Figure 5:
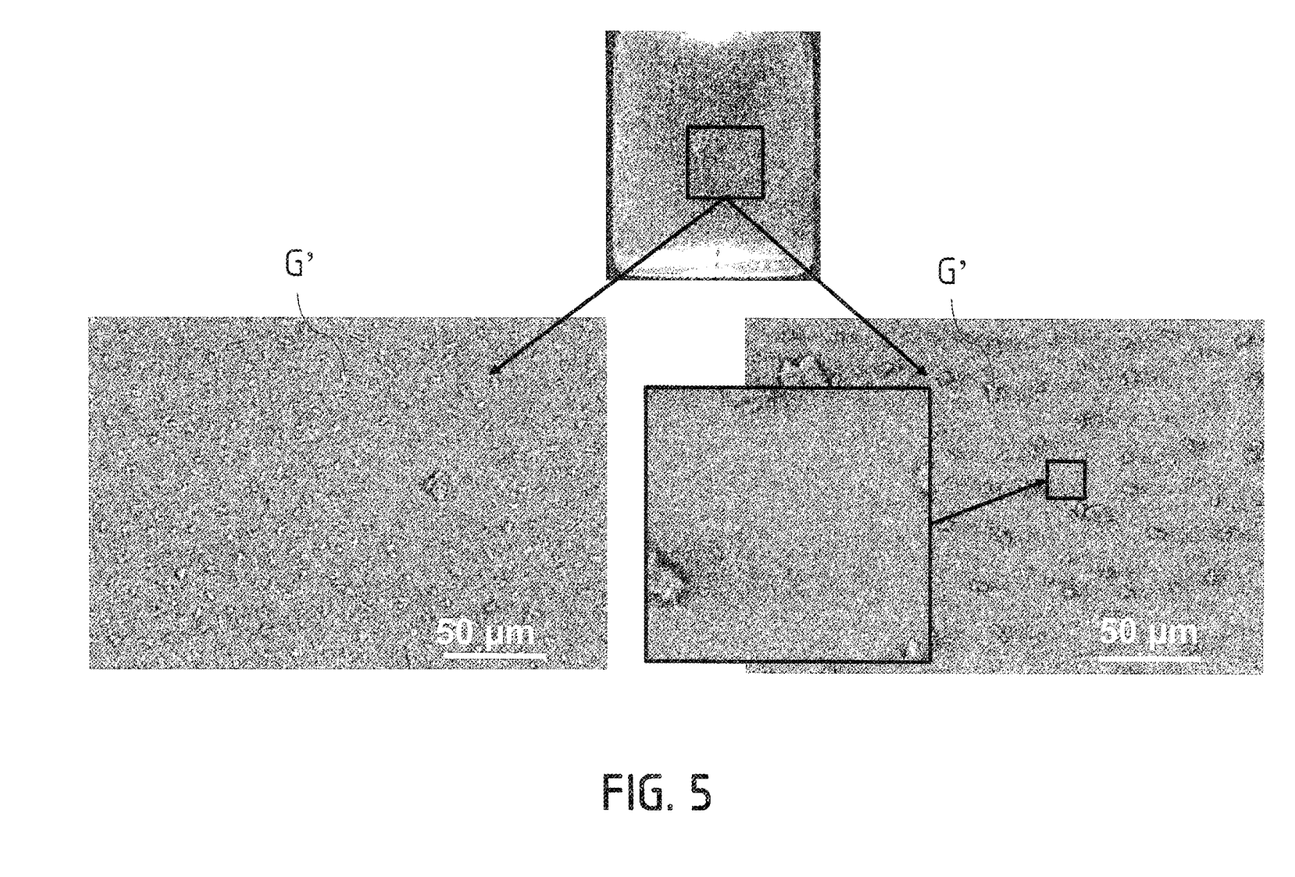

In FIG. 4 are shown SEM pictures of a surface portion of a glass wall fragment of the first vial. In FIG. 5 are shown, by way of comparison, SEM pictures of a surface portion of a glass wall fragment of the second vial, processed according to the invention.

Figure 6:
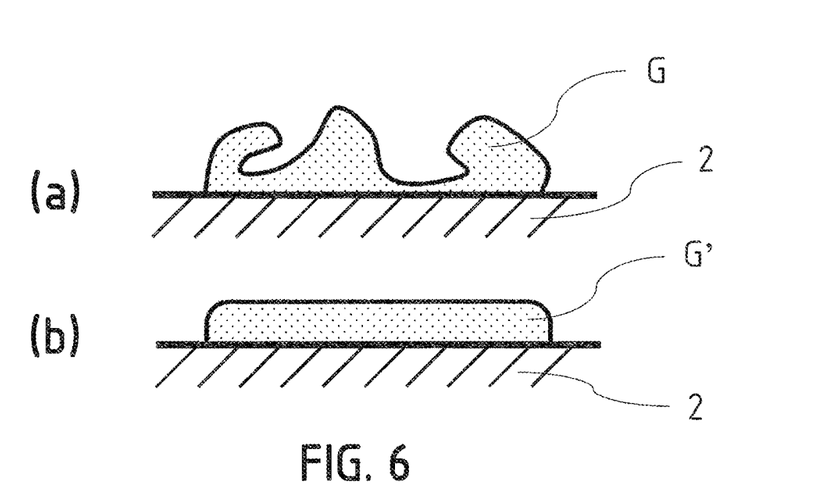
FIG. 6 schematically illustrates a modification, caused by the method according to the invention, of the grain morphology of the residual compound of a coating with which the wall of the containers to which the invention relates is provided.

As can be seen in FIG. 5, the observation by a scanning electronic microscope effectively confirms the presence of a coating including a residual compound, herein sodium sulphate grains, at the surface of the glass wall of the second vial, processed in accordance with the invention. The spraying step of the method according to the invention is hence actually different from a step of washing the glass wall. It is also observed that, in the absence of processing (FIG. 4), the grains G of residual compound present at the surface of the wall of the first vial correspond to agglomerates of smaller particles. Their morphology appears substantially faceted, their shapes are relatively complex, as schematically shown in FIG. 6(a). A certain porosity of these grains G can even be observed. On the other hand, after the processing according to method of the invention (FIG. 5), the grain density at the surface (number of grains per surface unit) has slightly decreased, the shape of the grains G' is softer, the grains G' appear wholly rounded or also polished (as schematically shown in FIG. 6(b)). The small grains, which contribute to the opacity of the first coating, are attenuated, or even disappear. The biggest grains are themselves polished by the sprayed droplets.

This microscopic observation of the modification of the configuration and morphology of the grains at the surface of the glass wall of a container processed according to the method of the invention allows explaining the more uniform character of the second coated formed, and also advantageously the more transparent character of the latter.

Moreover, in order to more specifically characterize the improvement of transparency of the glass wall 2 of the container 1 that can be advantageously provided by the processing method according to the invention, complementary comparative measurements of transparency have been performed, as described hereinafter, on a Type II glass container not subjected to the method according to the invention and on a Type II glass container subjected to said method.

Three different glass-wall containers have hence been analysed and compared, i.e.:
  Container $R_1$: Type III moulded vial of 50 ml (90% content: 54 ml), made of white soda-lime-silica glass;
  Container $R_2$: Type II vial of 50 ml (90% content: 54 ml), obtained from a Type III moulded vial made of white soda-lime-silica glass (identical to $R_1$), subjected to an ammonium sulphate dealkalization treatment, not subjected to the method according to the invention;
  Container $R_3$: Type II vial of 50 ml (90% content: 54 ml), obtained from a Type III moulded vial made of white soda-lime-silica glass subjected to an ammonium sulphate dealkalization treatment (identical to $R_2$), and successively subjected to the spraying step (inner and outer faces) and to the forced drying step of the method according to the invention.

Figure 7:
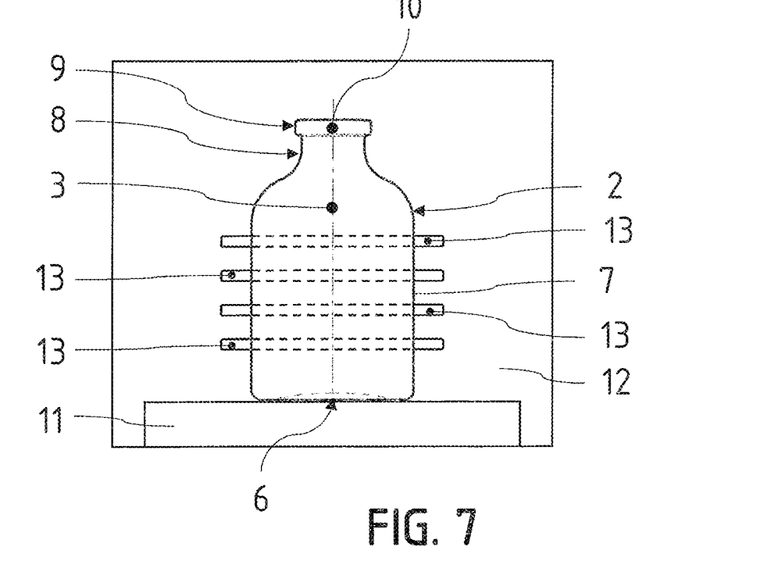
FIG. 7 schematically illustrates an experimental fixture for evaluating the uniformity of the second coating obtained at the end of the method according to the invention.

FIG. 7 schematically illustrates the experimental fixture retained for measuring the respective transparency of these containers $R_1$, $R_2$ and $R_3$. Each of the containers $R_1$, $R_2$ and $R_3$ is positioned on a horizontal support 11 in front of a black background 12 provided with horizontal white strips (test pattern). These white strips are formed by slots 13 cut into the black background, behind which is positioned a white light source (not illustrated). By means of a digital reflex camera, a picture is taken of each of the containers $R_1$, $R_2$ and $R_3$ positioned in front of the black background 12, in complete darkness. Then, thanks to an image processing software (for example, the above-mentioned "ImageJ" software), the pictures taken are each converted into an 8-bit grey-level digital image. A grey-level scale graph corresponding to the light intensity transmitted through the glass wall of the containers $R_1$, $R_2$ and $R_3$ is then drawn, based on the so-obtained images, along a vertical line corresponding to the height of the containers along their revolution axis.

Figure 8:
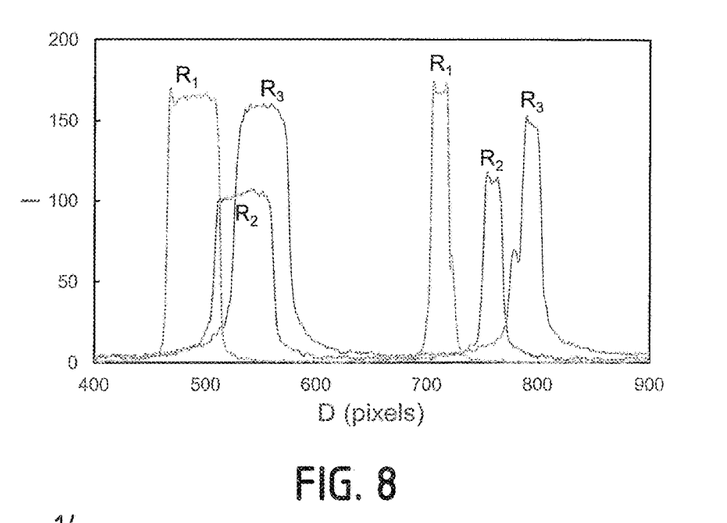
FIG. 8 illustrates as a graph results obtained during tests of evaluation of this uniformity by means of the fixture of FIG. 7.

The so-obtained graph is shown in FIG. 8. The transmitted light intensity is represented (in grey level) on the ordinates axis, and the distance between the ring and the bottom of the containers $R_1$, $R_2$ and $R_3$, along the revolution axis of these latter, is shown (in pixels) on the abscissa axis. In Table 1 hereinafter are compared the mean values of the transmitted light intensity collected for each of the containers $R_1$, $R_2$ and $R_3$, by considering only the light intensity relating to the two central horizontal with strips.

TABLE 1

| Containers | $R_1$ | $R_2$ | $R_3$ |
| --- | --- | --- | --- |
| Light intensity $I_i$ transmitted through the glass wall of the container $R_i$ (grey level) | 166 | 108 | 152 |
| Relative light intensity $I_i/I_1$ (%) | 100 | 65 | 92 |

It is hence observed that the container $R_3$, obtained according to the method of the invention, appears far more transparent than the container $R_2$ that has not been subjected to the method according to the invention. However, the container $R_3$ appears slightly less transparent than the container $R_1$ that has not undergone a dealkalization treatment, due to the presence of the residual compound (herein, sodium sulphate) at the surface of the glass wall of the container $R_3$. Advantageously, considering that the Type III container $R_1$ has a transparency of 100%, the container $R_3$ (obtained after having subjected the container $R_1$ to a dealkalization treatment, than after having subjected it to the processing method according to the invention) advantageously has a relative transparency comprised between 80 and 100%, according in particular to the implementation or not of the optional forced drying step of the processing method according to the invention.

Moreover, complementary analyses have been made by the applicant to investigate the durability of the transparency improvement provided by the method according to the invention. These analyses have demonstrated that the level of transparency of the glass wall of the containers obtained at the end of the processing method according to the invention is not significantly degraded after an oven ageing at 60° C. during 8 h.

Tests have also been performed in order to study the influence of the method according to the invention on the hydrolytic resistance HR of the surface of the glass wall container at the end of said method. In particular, comparative measurements have been made, as described hereinafter, between a Type III glass container not subjected to the method according to the invention and a Type II glass container subjected to said method.

The two following glass-wall containers have thus been analysed and compared;

Container $R_4$: Type II vial of 50 ml (90% content: 54 ml), obtained from a Type III moulded vial made of white soda-lime-silica glass subjected to an ammonium sulphate dealkalization treatment, not subjected to the method according to the invention (conventional Type II vial);

Container $R_5$: Type II vial of 50 ml (90% content: 54 ml), obtained from a Type III moulded vial made of white soda-lime-silica glass subjected to an ammonium sulphate dealkalization treatment (identical to $R_1$) and subjected to the method according to the invention (inner and outer faces).

The hydrolytic resistance HR of the surface of the glass wall of each of these containers $R_4$ and $R_5$ has been measured according to the indications of the European Pharmacopoeia, $9^{th}$ edition, Chapter 3.2.1, after sterilisation at 121° C. during 1 h in autoclave with ultra-pure water. For the type of vial considered, the limit HR value according to the European Pharmacopoeia is of 0.5 ml HCl N/100 for 100 ml of autoclavate (extraction water).

The results obtained are shown in Table 2 hereinafter:

TABLE 2

|  | $R_4$ | $R_5$ |
| --- | --- | --- |
| Surface HR (ml HCl N/100) | 0.05 ± 0.05 | 0.08 ± 0.05 |

The measurements of surface hydrolytic resistance HR hence show that the method according to the invention has advantageously no notable consequence on the level of hydrolytic resistance provided to the container by the dealkalization treatment step to which it has previously been subjected. The HR value remains advantageously substantially comprised between 5% and 25% of the limit HR value indicated by the European Pharmacopoeia for the type of container considered.

Also, a comparative study of the behaviour of these same containers $R_4$ and $R_5$ to an oven ageing at 60° C. has been performed by the applicant, according to the following protocol:

subjecting the containers $R_4$ and $R_5$ to a liquid spraying step according to the method according to the invention (herein, ultra-pure water), stoving the containers at 60° C. during 2 h to 8 h, sterilizing the containers at 121° C. during 1 h in autoclave with ultra-pure water, then stoving the containers a 60° C. during 2 h to 8 h, then measuring the surface hydrolytic resistance HR according to the European Pharmacopoeia, $9^{th}$ edition, Chapter 3.2.1 (HR value according to the European Pharmacopoeia is of 0.5 ml HCl N/100 for 100 ml of autoclavate).

The results obtained are shown in Table 3 hereinafter:

TABLE 3

|  | $R_4$ | $R_5$ | | | | |
| --- | --- | --- | --- | --- | --- | --- |
|  |  | Time of ageing at 60° C. (h) | | | | |
|  | / | 0 | 2 | 4 | 6 | 8 |
| Surface HR (mL HCl N/100) | 0.05 ± 0.05 | 0.08 ± 0.05 | 0.08 ± 0.05 | 0.06 ± 0.05 | 0.06 ± 0.05 | 0.06 ± 0.05 |

The measurements of surface hydrolytic resistance HR after oven ageing tend to show that the method according to the invention has no notable consequence on the durability of the level of hydrolytic resistance provided to the container by the dealkalization treatment step to which it has previously been subjected.

Advantageously, the method of the invention is an on-line method, intended for an industrial implementation. The different steps described hereinabove can for that purpose advantageously be directly integrated to an industrial method of manufacturing glass-wall containers, implemented in a preferentially automated manner.

The invention also relates, as such, to a facility 14 for processing a container 1 comprising a glass wall 2 delimiting a cavity 3 for accommodating a product, said glass wall 2 having an inner face 4 located facing said accommodation cavity 3 and an opposite outer face 5. The facility 14 in question is advantageously a facility allowing the implementation of a processing method according to the invention, so that the description given hereinabove in relation with the method according to the invention remains valid and applicable, mutatis mutandis, to the present facility. It is preferentially an industrial facility, advantageously automated, designed to process substantially continuously a great number of containers. Preferably, the facility 14 is designed to be directly integrated in a glassware production line, downstream from the forming machine of the container 1.

Figure 9:
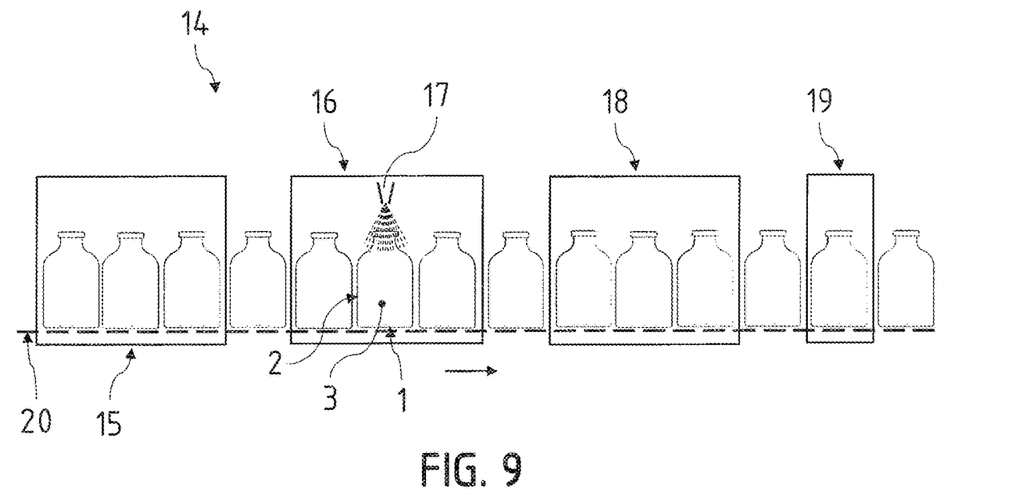
FIG. 9 schematically illustrates a particularly advantageous embodiment of the facility according to the invention.

A particularly preferential embodiment of the facility 14 according to the invention is schematically illustrated in FIG. 9. The arrow present in FIG. 9 indicates the preferential direction of advance of said container 1 with respect to the different stations comprises said facility 14, and that will be hereinafter described in detail. The terms "upstream" and "downstream" used hereinafter will have to be preferentially interpreted in consideration of the direction of advance, indicated by this arrow, of the container 1 within the facility 14 according to the invention.

According to the invention, said facility 14 comprises a station 15 for surface treating said glass wall 2, for subjecting said container 1 to a step of surface treatment of said glass wall 2 leading to the formation, on said glass wall 2, of a first coating that includes a solid residual compound. Advantageously, said surface treatment station 15 is designed to allow the implementation of the surface treatment step that has been described hereinabove in relation with the method according to the invention. More precisely, said surface treatment station 15 is a station for dealkanizing the glass in the vicinity of said inner face 4 of said glass wall 2. Therefore, said dealkalization station can advantageously be designed to allow the introduction within the accommodation cavity 3 of the container 1, through the opening 10 of the latter, of a substance containing sulphur, such as in particular ammonium sulphate.

Preferably, the facility 14 according to the invention comprises a station for annealing said container 1, for example of the arch type. In order to simplify the design of the facility 14, said surface treatment station 15 can potentially be merged with (or integrated into) said annealing station. As an alternative, said surface treatment station 15 could be positioned upstream from said annealing station.

As schematically illustrated in FIG. 9, the facility 14 according to the invention comprises a station 16 for spraying droplets of a liquid onto the surface of said glass wall 2, said spraying station 16 being positioned downstream from said surface treatment station 15. Advantageously, said spraying station 16 is designed to allow the implementation of the spraying step that has been described hereinabove in connection with the method according to the invention. Advantageously, and based on the above, said spraying station 16 is designed and configured to allow in fine the formation on said glass wall, from said first coating, of a second coating that includes said residual compound and that is more transparent and/or more uniform than said first coating.

Preferentially, said spraying station 16 comprises at least one spraying device 17 (for example, of the nozzle or sprinkler type), which is advantageously configured to be positioned, in operation, outside the container 1, and still more preferentially, above and opposite the ring 9 and the opening 10 of the container 1, as schematically illustrated in FIGS. 3 and 10. Preferably, said spraying device 17 is designed to be stationary with respect to the container 3 when said spraying device 17 is in operation. Said spraying station 16 is hence advantageously devoid of any complex mobile injection device (for example, of the pipette or tube type), which would be designed to be introduced into the accommodation cavity 3 of the container 1 to be processed, through the opening 10 of the latter, to spray the liquid droplets. Such a configuration contributes to the simplicity of design and implementation, as well as to the robustness, of the facility 14 according to the invention. Of course, the facility 14 according to the invention could nevertheless comprise a spraying station 16 that would be provided with such a mobile injection device.

Preferentially, said spraying station 16 is designed and configured to spray said droplets in the form of a fog, i.e. in the form of very thin droplets having a mean diameter typically lower, or even far lower, than 1 mm, in suspension in the ambient air (liquid aerosol). For example, the spraying device 17 of the spraying station 16 can comprise a nozzle, provided with an outlet orifice of fixed or variable diameter, from which the droplets will be sprayed in the average form of a spraying cone that is advantageously solid. Still more advantageously, said spraying device 17 is designed to spray droplets of said liquid, whose mean diameter is comprised between 1 and 10 µm, and preferably between 2 and 3 µm. For that purpose, said spraying device 17 preferentially comprises a piezoelectric or ultrasound nebulizer, or atomizer. Other suitable spraying devices could of course also be contemplated.

Advantageously, said spraying device 17 can be designed and configured to spray said droplets by means of a pressurized vector gas, preferably an inert gas (Ar, $N_2$, etc.). Preferentially, the spraying station 16 comprises means for regulating the quantity and the temperature of the sprayed droplets, as well as, if need be, the pressure of the vector gas.

Preferably, said spraying station 16 is designed and configured to spray the droplets of said liquid simultaneously onto the surface of said inner 4 and outer 5 faces of said glass wall 2. For example, said spraying station 16 can comprise a plurality of spraying devices 17 or nozzles, at least one of which being configured to come opposite the opening 10 of claim 1, as mentioned hereinabove, the others being configured to come opposite the outer face 5 of the glass wall 2 of the container 1. However, preferably, the spraying device(s) 17 is/are all configured to be positioned, in operation, above and opposite the ring 9 and the opening 10 of the container 1.

Advantageously, said spraying station 16 comprises means (not illustrated) for adjusting the distance between said spraying device 17 and said glass wall 2, and in particular the distance between the spraying device 17, on the one hand, and the ring 9 and the opening 10 of the container 1 to be processed, on the other hand. The spraying station 16 preferably comprises, in addition or as an alternative, means for adjusting the angle θ of the spraying cone of said spraying device 17 (FIG. 3), so that said angle θ is preferably comprised between 20 and 100°. Hence, said spraying station 16 can be adapted to different geometries and dimensions of containers to be processed. The adjustment of the angle θ of the cone of droplet spraying by the spraying device 17 advantageously further facilitates the simultaneous spraying of the droplets of said liquid simultaneously onto the surface of said inner 4 and outer 5 faces of said glass wall 2.

Preferably, the facility 14 comprises a station 18 for forced drying said glass wall 2, which is positioned downstream from said spraying station 16. Advantageously, said forced drying station 18 is designed to allow the implementation of the forced drying step that has been described hereinabove in relation with the method according to the invention. The forced drying station 18 preferentially comprises a system (not illustrated, for example of the nozzle or ramp type) for spraying towards the surface of the glass wall 2, and preferably from the outside of the container 3, a forced flow of dry gas (air or inert gas, such as Ar, $N_2$, etc.). Advantageously, the forced drying station 18 is designed and configured to spray a forced flow of dry gas simultaneously to the respective surfaces of the inner 4 and outer 5 faces of the glass wall 2.

Advantageously, the facility 14 comprises a station 19 for the optical inspection of said glass wall 2, positioned downstream from said spraying station 16. Advantageously, said forced drying station 18 is designed to allow the implementation of the optical inspection step that has been described hereinabove in relation with the method according to the invention. Said optical inspection station 19 may comprise any known device for optical inspection, and in particular visual inspection, adapted to detect glass defects at the glass wall 2 of the container 1. Preferably, it comprises at least one artificial vision inspection device, advantageously automated, designed for example to detect and identify contrast defects at the glass wall 2 of the container 1. Preferably, it is a means operating in the visible domain of the electromagnetic spectrum. Of course, said optical inspection station 19 could on the contrary comprise known means of manual visual inspection of said glass wall 2. Preferably, said optical inspection station 19 is positioned downstream from said forced drying station 18, so that the glass wall 2 of the container 1 is advantageously substantially devoid of liquid droplets when said container 1 arrives at the optical inspection station 19 from said forced drying station 18.

Preferably, said facility 10 also comprises conveyor means 20, for example of the belt, chain or also roll conveyor type, to ensure the transfer of the container 1 from the surface treatment station 15 up to the spraying station 16 and, advantageously, from said spraying station 16 up to the optical inspection station 19, by preferably passing through the forced drying station 18.

This being exposed, it will be noted that the idea underlying the invention described hereinabove, consisting in obtaining, from a first coating including a residual compound, a second coating that includes the residual compound and that is more transparent and/or more uniform than the first coating by spraying droplets of a liquid, could possibly be extended to surface treatment steps (and corresponding treatment stations) of different natures. Indeed, this idea can more generally find an interest from the moment that we have a glass wall container that comprises a solid residual compound deposited on the glass wall and resulting from a surface treatment step to which said container has been previously subjected, and that the presence of this residual compound is, in particular, liable to hamper the optical inspection of the container.

Hence, could be an invention as such:
- a method for processing a container having a glass wall delimiting a cavity for accommodating a product, said glass wall having an inner face located facing said accommodation cavity and an opposite outer face, said glass wall being provided with a first coating that includes a solid residual compound resulting from a step of surface treatment of said glass wall, to which said container has been previously subjected, said method comprising a step of spraying droplets of a liquid onto the surface of said glass wall, in order to form on said glass wall, from said first coating, a second coating that includes said residual compound and that is more transparent and/or more uniform than said first coating;

and/or
- a facility for processing a container having a glass wall delimiting a cavity for accommodating a product, said glass wall having an inner face located facing said accommodation cavity and an opposite outer face, said facility comprising a station for surface treating said glass wall, for subjecting said container to a step of surface treatment of said glass wall leading to the formation on said glass wall of a first coating that includes a solid residual compound, said facility comprising a station for spraying droplets of a liquid onto the surface of said glass wall, said spraying station being positioned downstream from said surface treatment station.

POSSIBILITY OF INDUSTRIAL APPLICATION

The invention finds its industrial application in the field of methods and facilities for processing glass-wall containers, and in particular in the field of methods and facilities for processing pharmaceutical or diagnostic glass primary packagings.

What is claimed is:

1. A method for processing a container (1) having a glass wall (2) delimiting a cavity (3) for accommodating a product, said glass wall (2) having an inner face (4) located facing said accommodation cavity (3) and an opposite outer face (5), said glass wall (2) being provided with a first coating that includes a solid residual compound resulting from a step of surface treatment of said glass wall (2), to which said container (1) has been previously subjected, said surface treatment step being a step of dealkalizing the glass in the vicinity of the surface of said inner face (4) of said glass wall (2), said method comprising a step of spraying droplets of a liquid onto the surface of said glass wall (2), in order to form on said glass wall (2), from said first coating, a second coating that includes said residual compound and that is more transparent and/or more uniform than said first coating.

2. The method according to claim 1, wherein said residual compound is powdery.

3. The method according to claim 1, wherein said dealkalization step comprises a treatment of said inner face (4) with a substance containing sulphur.

4. The method according to claim 3, wherein said solid residual compound contains sodium sulphate.

5. The method according to claim 1, wherein said spraying step is performed on said container (1), the latter being at a temperature between 0 and 100° C.

6. The method according to claim 5, wherein said temperature is ambient temperature.

7. The method according to claim 1, wherein said spraying step is performed simultaneously onto the surface of said inner (4) and outer (5) faces of said glass wall (2).

8. The method according to claim 1, wherein said liquid is sprayed in the form of a fog.

9. The method according to claim 8, wherein at least 95% of said droplets have a diameter between 1 and 10 µm.

10. The method according to claim 9, wherein said diameter is from 2 to 3 µm.

11. The method according to claim 1, wherein said liquid is a solvent of said solid residual compound.

12. The method according to claim 11, wherein said solvent is water.

13. The method according to claim 12, wherein said solvent is ultra-pure water.

14. The method according to claim 1, which comprises, after said spraying step, a step of forced drying said glass wall (2).

15. The method according to claim 1, which comprises, after said spraying step, a step of optical inspection of said glass wall (2).

* * * * *